April 21, 1953     D. DALIN ET AL     2,635,587
APPARATUS FOR PREHEATING COMBUSTION AIR AND
FEED WATER FOR STEAM GENERATING PLANTS
Filed Dec. 2, 1946
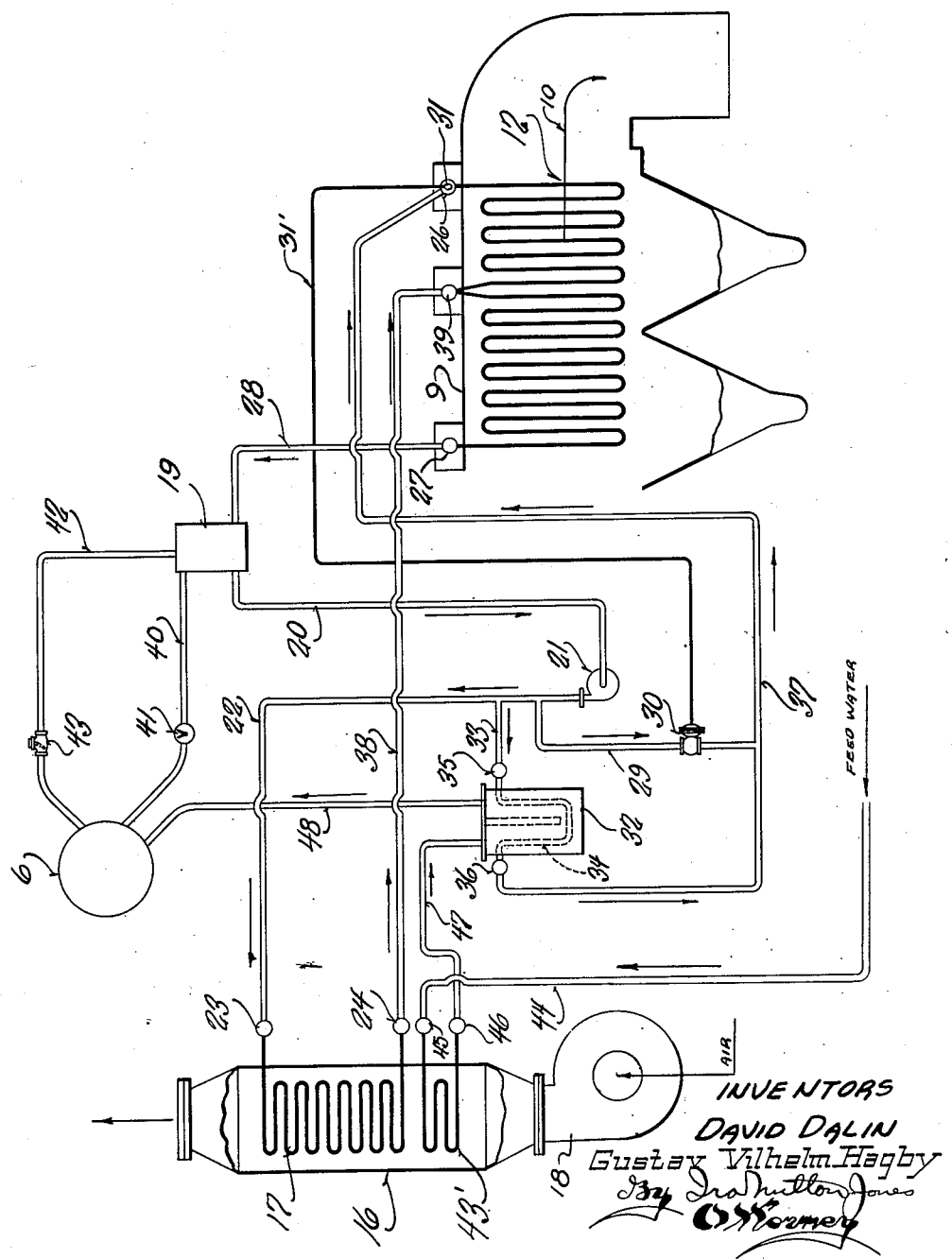
INVENTORS
DAVID DALIN
Gustav Vilhelm Hagby
By Ira Mutton Jones
Attorney

UNITED STATES PATENT OFFICE 2,635,587

APPARATUS FOR PREHEATING COMBUSTION AIR AND FEED WATER FOR STEAM GENERATING PLANTS

David Dalin, Stenkullen, Ronninge, and Gustav Vilhelm Hagby, Ostertalje, Sweden, assignors, by direct and mesne assignments, to AB Svenska Maskinverken, Sodertalje, Sweden, a corporation of Sweden Application December 2, 1946, Serial No. 713,438
In Sweden December 7, 1945

4 Claims. (Cl. 122—1)

This invention relates broadly to indirect transfer or transmission of heat from one fluid to another, and refers more particularly to the preheating of combustion air and/or feed water for steam generating plants from the flue gases emanating from the furnace of the plant.

If high efficiency is to be achieved in a steam generating plant, the greatest possible amount of heat must be abstracted from its flue gases. Thus, it has been the practice to provide steam generating plants with combustion air preheaters and economizers (in which the feed water is preheated) both located in the gas pass to abstract heat from the flue gases flowing therethrough. However, the amount of heat that can be abstracted from the flue gases by such conventional air preheaters and economizers is limited by the need for keeping the heat exchange surfaces of these units at a temperature above the dew point of the flue gases flowing thereover to avoid the objectionable consequences of having the moisture in the flue gases condense on these heat exchange surfaces. In the case of air preheaters, this has always been an especially troublesome problem as the incoming air is much colder than the flue gases. The only solution of this problem heretofore known was to recirculate part of the already preheated air with the incoming air.

While such recirculation of already preheated air generally, could be relied upon to preclude condensation of moisture from the flue gases on the heat exchange surfaces and the consequent objectionable deposits on the wet surfaces, this expedient, to a large degree, nullifies the advantages of the air preheater and interferes with proper delivery of combustion air to the furnace.

The objections of having the heat exchange surfaces of the air preheater or economizer drop to a temperature below the dew point of the gases flowing thereover is especially serious in plants in which the flue gases contain a large amount of dust and corrosive fumes. In such instances it has been the practice to construct the air preheater of heavy castings of special construction. These units are very heavy and cumbersome and thus difficult to install.

In view of the cumbersome and expensive construction of such air preheaters they frequently have no provision for return circulation of the preheated air, or provide for only a slight return circulation. As a consequence, the temperature in the cold portion of the air preheater frequently falls below the dew point of the flue gas thus causing condensation of the moisture contained in the flue gas on the heat exchange surface of the air preheater. The resulting wet surfaces provide fertile conditions for corrosion by the fumes contained in the flue gases and a rapidly formed deposit of dust and dirt, the removal of which generally requires the use of lye solutions.

The present invention overcomes all these difficulties in a simple inexpensive manner, and to this end, it is an object of this invention to provide an improved method and apparatus for transferring heat from the flue gases emanating from the furnace of a steam generating plant or the like to the combustion air for the furnace, or to the feed water fed to the steam drum of the plant, and to effect such heat transfer indirectly in a manner assuring the maintenance of high efficiency and at the same time precluding the condensation of moisture contained in the flue gases on the heat exchange surfaces over which the flue gases flow.

With the above and other objects in view which will appear as the description proceeds, this invention resides in the novel method and apparatus as hereinafter described and more particularly defined by the appended claims, it being understood that such changes in the precise embodiment of the herein disclosed invention may be made as come within the scope of the claims.

The accompanying drawing illustrates one complete example of the physical embodiment of the invention constructed according to the best mode so far devised for the practical application of the principles thereof, and in which the single figure is a view diagrammatically illustrating portions of a steam generating plant with this invention applied thereto as a preheater for feed water as well as combustion air.

Referring now more particularly to the accompanying drawings in which like numerals indicate like parts, the numeral 6 designates the steam dome of a steam generating plant having a furnace equipped with steam generating surfaces or boiler tubing (not shown). Inasmuch as the specific style or type of the steam generating plant is not important to the application of this invention, details thereof have not been illustrated. For a more complete disclosure of a typical plant with which this invention may be used, reference may be had to the copending application, Serial No. 622,832, filed October 17, 1945, now Patent 2,550,676, by one of the present applicants.

The flue gases are conducted away from the furnace through a gas pass 9, only a portion of which is shown, the path of these gases being indicated by the arrows 10. In their passage through the gas pass 9 the flue gases flow over the heat exchangers (not shown) usually located in the gas pass, and which serve various purposes, as for instance the superheating of the generated steam.

A conventional air preheater (not shown) may be located in the gas pass beyond the usual heat exchangers (not shown) and the final section or length of the gas pass has a heat exchanger 12 located therein. This heat exchanger 12 performs an important function in the present invention, and will be designated hereinafter as the primary heat exchanger.

The inlet of the conventional air preheater (not shown) is adapted to be connected with the discharge end of a casing 16 exteriorly of the gas pass and the furnace, and in which a secondary heat exchanger 17 is located. Air is supplied to the casing 16 by a fan or blower 18. Thus the temperature of the incoming air is raised in passing over the secondary heat exchanger 17 before it enters the conventional preheater (not shown).

The primary heat exchanger 12 and the secondary heat exchanger 17 are connected in a closed circulatory system through which a fluid heat exchange medium is circulated to transfer heat from the flue gases to the incoming combustion air in a manner obviating all the objectionable consequences resulting from having cold air pass directly into the conventional air preheater.

This closed circulatory system comprises an expansion tank 19 connected by a duct 20 with the inlet of a pump 21. The outlet of the pump is connected through a duct 22 with the intake header 23 of the secondary heat exchanger 17. The discharge header 24 of the secondary heat exchanger is connected through a duct 38 with an intermediate intake header 39 of the primary heat exchanger, while the discharge header 27 of the primary heat exchanger is connected with the expansion tank or chamber 19 through a duct 28.

If the fluid heat exchange medium circulated through the system by the pump 21 is a liquid, which is preferable, the expansion chamber 19 may be open at the top without altering the fact that heat exchange medium circulates in a closed circuit or system thus making it possible to use a liquid heat exchange medium that has been treated to preclude scale formation in the primary heat exchanger 12. If desired, however, the expansion chamber may be fully closed except for a steam discharge duct 42 through which steam generated in the system may be drawn off.

While the heat exchange medium circulated through this system is generally water, any other liquid having a high boiling point can be used with satisfactory results; the important consideration being that the heat exchange medium be capable of carrying off the heat from the flue gases and transferring it to the incoming combustion air moving over the secondary heat exchanger 17, thereby effecting an indirect transfer of heat from the flue gases to the combustion air.

Inasmuch as it is the chief function of this invention to utilize the heat contained in the flue gases to preheat a fluid which may be air for combustion, and/or the feed water for the steam generating plant, in a manner which precludes condensation of the moisture contained in the flue gases on the heat exchange surfaces over which the flue gases flow, it is of course, important that the temperature of the heat exchange medium being circulated through the primary heat exchanger 12 be high enough to insure that all surfaces thereof have a temperature above the dew point of the flue gases flowing thereover.

To insure this condition, it is of course, possible to so design the heat exchangers 12 and 17 that the amount of heat given off or extracted from the heat exchange medium at the secondary heat exchanger 17 will not be so great as to lower the temperature of the circulating heat exchange medium beyond a predetermined value, which under normal circumstances should not be less than 60° C., as it enters the primary heat exchanger 12. It is also possible to control the amount of heat given off at the secondary heat exchanger 17 by regulating the fan 18 to pass more or less air over the heat exchanger 17.

However, it is more expedient to provide a bypass 29 connecting with the outlet of the pump 21 and leading back to the inlet header 26 of the primary heat exchanger, through which the heat exchange medium issuing from the pump can by-pass the secondary heat exchanger 17. This by-pass is controlled by a pressure operated valve 30, governed by a thermo-responsive element 31 located in or at the intake header 26 of the primary heat exchanger 12 and operatively connected with the valve 30 by a control duct 31' containing an expansible fluid.

Thus if the valve 30 is fully open there will be little or no circulation of heat exchange medium through the secondary heat exchanger 17. With the valve 30 adjusted to hold the by-pass open until the heat exchange medium reaches the desired temperature at its point of entry into the primary heat exchanger 12, the circulation of the heat exchange medium through the system will be automatically regulated to maintain the heat exchange surfaces of the primary heat exchanger 12 at a temperature above the dew point of the flue gases flowing thereover.

Obviously the secondary heat exchanger 17 can be employed to utilize the heat derived from the flue gases in ways other than that illustrated. For instance part of the air passed over the secondary heat exchanger 17 instead of being fed to the conventional air preheater (not shown), might be fed to some other point of use, or a number of such secondary heat exchangers 17 might be arranged in parallel with the air flowing thereover going to different points of use; but inasmuch as these modifications all fall within the general concept illustrated, specific illustration thereof is unnecessary.

A feed water preheater 32 is connected in parallel with the secondary heat exchanger 17, the outlet of the pump being connected with the feed water preheater 32 through a branch duct 33 leading from the duct 22. The feed water preheater 32 is of any suitable design and construction having a series of coils or loops designated generally by the numeral 34, fed with the heat exchange medium from the branch duct 33 through a distributing header 35. The return header 36 to which the coils or loops 34 are connected is in turn connected to a return line 37 which leads to the intake header 26 of the primary heat exchanger. The by-pass duct 29, of course, may connect with the return line 37, as shown.

As stated, the discharge header 24 of the secondary heat exchanger 17 is connected by means of return duct 38 with the intermediate header 39 connected to the coils of the primary heat exchanger 12. This arrangement is employed inasmuch as the heat exchange medium returning from the secondary heat exchanger 17 is warmer than that returning from the feed water preheater 32, the coils 34 of which may be considered a second secondary heat exchanger. Thus the colder heat exchange medium returning from this second secondary heat exchanger has its temperature raised in passing through the section of the primary heat exchanger 12 lying between its intake header 26 and its intermediate header 39 before the heat exchange medium returning from the secondary heat exchanger 17 is brought in contact therewith.

Since the expansion chamber 19 is closed, water may be supplied thereto from the steam dome 6 through a feed duct 40 upon opening of a valve 41. Steam accumulating in the expansion chamber 19 is fed to the dome 6 through the steam line 42, and the steam line is preferably provided with a suitable check valve 43.

The specific manner in which the air and feed water preheaters, that is the two secondary heat exchangers, are connected in the system may be varied to suit different requirements. For instance, these heat exchangers instead of being connected in parallel as illustrated might be connected in series and instead of having the expansion chamber 19 fed from the steam dome 6 a suitable heat exchange medium may be supplied thereto from some other source.

This latter arrangement has the advantage of permitting absolutely pure distilled water to be used as the heat exchange medium to thus obviate the possibility of scale formation inside the coils of the heat exchanger 12.

Also the heat exchange medium instead of being conducted directly from the feed water preheater 32 to the primary heat exchanger 12 might have its return line 37 include a length of coil (not shown) disposed within the air stream passing to the secondary heat exchanger 17. In the arrangement shown, the air flowing to the secondary heat exchanger 17 first flows over an auxiliary heat exchanger 43' through which the feed water is circulated before being fed to the preheater 32. Hence the feed water supply line 44 leads to the intake manifold 45 of the auxiliary heat exchanger and its discharge manifold 46 is connected by a duct 47 to the feed water preheater 32 from which the preheated feed water flows through a duct 48 to the steam dome 6.

Inasmuch as the incoming feed water generally is quite warm, though of course not hot enough for direct injection into the steam drum, and as it is desirable to have as great a temperature differential as possible between the feed water and the heat exchange medium flowing through the coil of the feed water preheater 32 so as to extract all the heat permissible from the heat exchange medium, passing the feed water through the auxiliary heat exchanger 43' has a definite advantage. Not only does it help attain the desirably large temperature differential between the feed water and the heat exchange medium, but it utilizes the heat of the warm incoming feed water to effect an initial heating of the combustion air.

From the foregoing description taken in connection with the drawings, it will be readily apparent that this invention provides a method and apparatus for utilizing the heat contained in the flue gases emanating from the furnace of a steam generating plant in such a way as to extract the greatest possible amount of heat from these flue gases without in any wise incurring the disadvantages resulting from the condensation of moisture contained in the flue gases upon the surfaces of heat exchangers located in the flue gas pass.

What we claim as our invention is:

1. In a steam generating plant having a furnace and a gas pass through which the flue gases leave the furnace, means for utilizing the heat contained in said flue gases to simultaneously preheat feed water for the boiler and combustion air for the furnace, comprising: a primary heat exchanger located in the gas pass to have hot flue gases pass thereover; a combustion air heating heat exchanger located exterior to the generating plant and the gas pass and adapted to heat combustion air; means for moving combustion air in its passage to the furnace through the heat absorbing section of said combustion air heating heat exchanger; a feed water heating heat exchanger located exterior to the generating plant and the gas pass and adapted to preheat feed water; means for moving feed water on its way to the steam dome through the heat absorbing section of said feed water heating heat exchanger; means for circulating an intermediate heat exchange medium through said primary heat exchanger and through the heat supplying sections of the feed water and combustion air heating heat exchangers; means defining a return path for said intermediate heat exchange medium leading from the outlet of the heat supply section of the feed water heating heat exchanger to that portion of the primary heat exchanger farthest downstream in the gas pass; and means defining a return path for said intermediate heat exchange medium leading from the outlet of the heat supplying section of the combustion air heating heat exchanger to the primary heat exchanger medially of its ends and at a point where the temperature of the medium flowing in the primary heat exchanger is substantially equal to that of the cooled medium returning from said combustion air heating heat exchanger.

2. In a steam generating plant, apparatus for utilizing the heat contained in the flue gases flowing in the gas pass of the plant to simultaneously preheat feed water being fed to the boiler of the plant and combustion air being fed to furnace of the plant, comprising: a heat exchanger in the gas pass so that the flue gases flow thereover; a feed water heater exterior to the generating plant and the gas pass; means for conducting feed water through the heat absorbing section of said water heater in heat exchange relation with heating fluid flowing through the heat supplying section thereof; an air heater exterior to the generating plant and the gas pass; conduit means for conducting combustion air through the heat absorbing section of said air heater in heat exchange relation with heating fluid flowing through the heat supplying section thereof; duct means connecting the outlet of the heat exchanger in the gas pass with the inlet of the heat supplying section of the water heater and with the inlet of the heat supplying section of the air heater; duct means connecting the outlets of the heat supplying sections of the water and air heaters with the heat exchanger in the gas pass; said duct means together with the heat exchanger in the gas pass and the heat supplying sections of the water and air heaters providing a circulating system through which heating fluid contained in said system may be circulated; a pump for effecting circulation of heating fluid in the system from the heat exchanger in the gas pass through the heat supplying sections of the water and air heaters and back to the heat exchanger in the gas pass; other duct means providing a by-pass for heating fluid around the heat supplying section of the water heater; a valve in said by-pass; a temperature responsive control element positioned to be responsive to the temperature of the heating fluid issuing from the heat supplying section of the water heater; and valve controlling and actuating means connecting the temperature responsive control element with the valve in the by-pass, said control element and the valve controlling and actuating means being arranged to open the valve as the temperature of the heating fluid at the control element drops to thereby regulate fluid flow through the heat supplying section of the water heater as required to maintain the temperature of the heating fluid returning to the heat exchanger in the gas pass high enough to preclude condensation of the flue gases upon the surfaces of said last named heat exchanger.

3. The apparatus set forth in claim 2 further characterized by the fact that the return duct leading from the outlet of the heat supplying section of the water heater is connected with the heat exchanger in the gas pass at the portion thereof farthest downstream in the gas pass and by the fact that the return duct leading from the outlet of the heat supplying section of the air heater connects with the heat exchanger in the gas pass at a point medially of its ends.

4. The apparatus set forth in claim 2 further characterized by the provision of a preliminary air heater in the conduit means for the combustion air, ahead of said air heater, to initially raise the temperature of the air flowing through said conduit means to the air heater; and duct means connecting said preliminary air heater with the inlet of the heat absorbing section of the water heater so that the feed water flows through the preliminary air heater before the feed water reaches the heat absorbing section of the water heater.

DAVID DALIN.
GUSTAV VILHELM HAGBY.

References Cited in the file of this patent

UNITED STATES PATENTS

| Number | Name | Date |
|---|---|---|
| 236,208 | Blanchard | Jan. 4, 1881 |
| 444,976 | Dodge | Jan. 20, 1891 |
| 1,612,854 | Broido | Jan. 4, 1927 |
| 1,741,567 | Heaton | Dec. 31, 1929 |
| 1,833,130 | Roe | Nov. 24, 1931 |
| 1,927,215 | Peebles | Sept. 19, 1933 |
| 1,941,365 | Patterson | Dec. 26, 1933 |
| 1,975,519 | Rudorff | Oct. 2, 1934 |